Patented Sept. 6, 1949

2,481,412

UNITED STATES PATENT OFFICE 2,481,412

INACTIVATED COMPOUNDS OF ANTI-ANEMIA METALS

George E. Grindrod, Oconomowoc, Wis., assignor to Wisconsin Alumni Research Foundation, Madison, Wis., a corporation of Wisconsin No Drawing. Application March 26, 1945, Serial No. 585,005

5 Claims. (Cl. 167—68)

The present invention relates to the art of fortifying foods and foodstuffs with minerals, and is concerned more particularly with the provision of compositions containing all or some of the metals iron, copper and manganese, in which the components are in a substantially unionizable state and are rendered incapable of catalytic activity but are releasable, in a state of catalytic or/and chemical activity, in the digestive tract. The invention includes both process and product aspects.

The metals iron, copper and manganese, or some one or more of them, are required for the generation of hemoglobin. A deficiency of these metals in the diets of man and other animals results in nutritional anemia. A slight deficiency retards the rate, and the extent, of growth of young animals. Deficiency is widespread. The metallic constituents are in general incompatible with most foods since they act as catalysts to oxidize vitamins and other constituents thereof. They have heretofore been incompatible in canned or sterilized foods, whether present therein naturally or whether added as fortifying agents.

The simple compounds of the metals, even if they are water-insoluble, react sufficiently with foods to cause oxidation. In wet canned foods and in liquiform foods they either go into solution slowly or react by direct contact of the particles. Dietary mineral fortification, accordingly, has heretofore been accomplished by enclosing a dose of ingredients carrying the metals in an assimilable container, such as the conventional gelatin capsule, and ingesting the dose as such. While this method is successful, it is both circumscribed as to applicability and inconvenient.

It is an object of the present invention to provide inactivated compounds or compositions which are compatible with foods, foodstuffs and foodstuff factors including vitamins. Another object of this invention is the provision of food- or foodstuff-compatible compounds or compositions containing metals of the anti-anemia group, which compounds or compositions contain an adequate proportion of the metals and which can be combined with a wide variety of foods, foodstuffs and foodstuff factors whereby adequately to fortify the latter with such metals and hence to render separate medication unnecessary. A further inventive object is the provision of a process of inactivating potentially catalytically active finely divided particles of a compound of a metal having dietary utility.

I have found that various poorly soluble and water-insoluble compounds of metals, e. g., poorly soluble and water-insoluble compounds of metals of the anti-anemia group, can be rendered compatible with foods, foodstuffs and foodstuff factors including normally readily oxidizable vitamins by a process which involves encapsulating the metal compound, in substantially colloidally disintegrated state, with films, sheaths, layers or coatings of a suitable assimilable protective colloid. More particularly, I have found that temporarily non-ionized and unreactive compounds of iron, copper and/or manganese can be produced, in which minutely subdivided particles of suitable forms of the metal compounds are encapsulated in coatings of adsorbed colloid, and that while the so-encapsulated particles will not react by contact with potentially readily oxidizable components of a food, and will not release metallic ions so long as the foodstuff medium containing them is neither so alkaline nor so acidic as to dissolve the absorbed colloid, the contained metals will become active when the encapsulated particles are treated with gastric juice or dilute hydrochloric acid.

The production of the inactive metallic compounds or colloidal metallic structures includes the steps of (1) dispersing poorly soluble or water-insoluble compounds of one or more than one of the anti-anemia metals iron, copper and manganese to near-colloidal state of subdivision, while suspended in a liquid medium containing an assimilable protein or other suitable assimilable colloid in dispersed form; and (2) effecting a colloidal reaction by violent agitation and heating, between the particles of the metallic compound or compounds and the protein or other colloid, whereby the former are completely encased or encapsulated in adsorbed colloid. Since the extent of the colloidal reaction (i. e., the extent of adsorption) is a function of the fineness of subdivision of the metallic compounds, I propose in step 1 above to carry the dispersing of said metallic compounds, in the liquid medium, to the point where they appear to be actually in solution in the latter, i. e., colloidally dispersed therein. For effecting step 2 above I prefer (1) to heat the colloidal "solution" of metallic compounds in liquid dispersion of colloid to an elevated temperature near to but below that at which said colloid would coagulate and (2) simultaneously violently to agitate the "solution" by means of fine jets of high pressure steam. As the "encapsulating colloid" there may be used casein, zein, soy bean protein and other proteins having generally similar characteristics to those of casein.

The resulting suspension of colloid-encapsulated particles or aggregates—the individual particles of which may have a size of the order of 10 microns—may be incorporated, as such, into liquiform foodstuffs or foodstuff elements. Or, the encapsulated particles may be separated from the suspending medium, dried, and incorporated in dry form into dry foodstuffs or elements thereof. In either event, the encapsulated metallic compounds are not ionized and not capable of catalytic activity so long as they remain in a medium of about the same pH as that in which they were formed, although they become ionizable and active when released from the encasing colloid as by the action of dilute hydrochloric acid or gastric juice. In the alternative, the encapsulated particles, by reason of the stability of the metal compounds therein, may constitute the basis of medicaments for oral administration of said anti-anemia metals.

By the carrying out of the above described process the field of utility of certain organic compounds of anti-anemia metals heretofore proposed for use in combating anemia can be materially enlarged. Thus, the normal catalytic activity of very finely subdivided phytates of anti-anemia metals, e. g., iron inositol hexaphosphate or/and copper inositol hexaphosphate, may be temporarily nullified by dispersing said phytates to a near-colloidal state while suspended in a suitable liquid medium containing, colloidally dispersed therein, an assimilable colloid, and inducing the aforesaid adsorption reaction whereby the metal phytate particles are encapsulated within adsorbed coatings or layers of the colloid. Thereby, the finely subdivided metal vitaminate particles are stabilized and maintained in a state of potential catalytic activity.

This same encapsulation measure serves, also, to produce new stabile forms of other vitaminates of anti-anemia metals, e. g., iron and copper compounds of vitamins A, D and E (see Milas Patent No. 2,296,291). For instance, the iron-carrying derivative of vitamin D, produced by replacing the hydrogens of the hydroxyl groups of three mols of the vitamin by Fe, according to the equation:

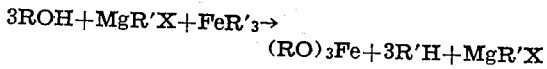

(wherein R represents the hydrocarbon portion of vitamin D, and R' represents alkyl) may be dispersed to near-colloidal fineness in a liquid medium containing dispersed assimilable colloid, and the particles encapsulated within adsorbed layers of the colloid.

The invention will now be described with greater particularity, with reference to the following illustrative specific examples.

*Example 1*

0.5 part by weight of a finely divided mixture of phytates of iron, copper and manganese, containing substantially equimolecular amounts of copper and manganese phytate and 10 parts by weight of iron phytate per each 1 part by weight of the copper salt, are admixed with a colloidal dispersion of 100 parts by weight of zein in 900 parts by weight of water and the fluid is subjected to dispersion by means of a homogenizer. The homogenized material thereupon, or after a preliminary heating to about 200° F., is transferred to a closed pressure vessel fitted with steam jets, specifically an apparatus such as one of those disclosed in U. S. Patents No. 1,461,653 and 1,714,597, wherein it is heated, in the course of a few minutes, to approximately 250° F. and simultaneously violently agitated and severely dispersed by high pressure steam jets. The so-treated mixture thereupon is spray dried, in a reducing or substantially non-oxidizing atmosphere, to a moisture contents of about 5%.

In lieu of spray drying, the dispersion may, after cooling, be incorporated into a liquiform food product in an amount calculated to fortify the latter with anemia protective metals.

*Example 2*

Instead of the zein solution (colloidal) of Example 1, I employ in this embodiment of the invention a colloidal solution or aqueous dispersion of a suitable casein compound such as sodium caseinate or the naturally occurring calcium caseinate. In so working I substitute for the zein solution, in Example 1, 1000 parts by weight either of a 10% sodium caseinate in water or, preferably, of concentrated skim milk containing about the same proportion of casein.

The finely divided mixture of metal phytates is admixed with the concentrated skim milk and dispersed by treatment in a colloid mill to the appearance of a viscous fluid. Thereafter, the dispersion is subjected to heat and simultaneous violent agitation in the steam jet vessel. The resulting "cream," after suitable cooling, preferably by discharge to a vacuum, is in a form adapted to be incorporated into liquiform foods or into foodstuffs when in a liquiform stage of processing.

*Example 3*

According to this embodiment of the invention, each of the metal phytates is dispersed and encapsulated in protective colloid by carrying out the following modification of the process described in Example 1 or of the process described in Example 2: instead of the mixture of iron, copper and manganese phytates a corresponding amount of a single metal phytate is employed in each case. By so processing the separate complexes there is realized the advantage that a variety of differently proportioned mixtures of any two or all three of the complexes may readily be compounded, as desired, from stocks of said separate complexes.

*Example 4*

300 gm. of ferrous phosphate, 20 gm. of copper phosphate and 21.5 gm. of manganous phosphate are mingled and finely pulverized in a colloid mill. The resulting impalpable powder is incorporated into 1 kg. of a 10% colloidal dispersion of soya bean protein in water, and the fluid mixture is subjected to dispersion first by means of a homogenizer at substantially room temperature and thereafter by means of high pressure steam jets. In the latter step, the mixture is heated, in the course of a few minutes, to approximately 250° F. and simultaneously is violently agitated and severely dispersed. Under the conditions recited, the dispersed, near-colloidal, particles of metal phosphate adsorb over their surfaces coatings of—that is, become encapsulated by—the soya bean protein. The resulting "cream" is a stable suspension which may be incorporated into liquiform foods or may, if desired, be dehydrated by known technique and employed as a dry fortifying agent.

*Example 5*

Iron, copper and manganese vitaminates of vitamin D are mingled in such proportions as to yield a mixture wherein the amount of copper and the amount of manganese are substantially equal and each amounts to about one-tenth of the iron. The resulting admixture is dispersed in concentrated skim milk, containing about 10% by weight of casein, by means of a colloid mill. The proportion of metal vitaminates to skim milk is such that in each kilo of the resulting dispersion there is present about 1000 mg. of iron calculated as elemental iron, and 100 mg. each of copper and manganese.

This dispersion is heated and simultaneously violently agitated by treatment thereof in a multiple steam jets vessel such as that described in U. S. Patent No. 1,714,597: in this step the dispersion is heated to but not materially above 250° F. within a period of 4–5 minutes. The effect of this violent disruption and heating of the vitaminates is to encapsulate the individual near-colloidal particles thereof in adsorbed coatings of casein, said coatings being free from anti-anemia metals. The colloidal dispersion of encapsulated metal vitaminates may be incorporated, as such, into liquiform foods.

*Example 6*

114.5 gm. of ferrous sulphate ($FeSO_4.H_2O$), 7.25 gm. of manganese sulphate ($MnSO_4.H_2O$) and 9.03 gm. of copper sulphate ($CuSO_4.5H_2O$) are dissolved in 1 liter of air-free distilled water, and 80 cc. of said solution are combined, at room temperature, with 1 kg. of concentrated skim milk containing about 22.5% total solids. The mixture is heated to an elevated temperature near to but below 220° F., and thereupon is transferred to a closed pressure vessel provided with steam jets, such as that described in U. S. Patent No. 1,714,597, wherein said mixture is subjected to the severe dispersive effect, and violent agitation, of high-pressure steam jets, and simultaneously is heated to approximately 250° F. Under the conditions recited the metal salts react with the casein to produce a fine precipitate of insoluble caseinates of the metals iron, copper, and manganese suspended in milk serum.

This precipitate is separated from the milk serum and is added to 500 grams of a 10% solution of sodium caseinate in water, in which latter the precipitate is redispersed by means of a colloid mill to a viscous fluid. Encapsulation of the metal caseinate particles by means of casein, already partially effected by the treatment in the colloid mill, is completed by heating the re-dispersion to a temperature near to but below the coagulation temperature: this heating may, with advantage, be effected in a pressure vessel provided with steam jets, e. g., in an apparatus similar to that described in U. S. Patent No. 1,714,597.

*Example 7*

The procedure of Example 6 is repeated, except that for the casein represented by 1 kg. of concentrated skim milk there is substituted a corresponding reacting proportion of ovalbumen. In this case the metal salts react with the albumen to produce a fine precipitate of difficultly soluble albuminates of the aforesaid metals, which albuminate particles thereupon are encapsulated in adsorbed coatings of casein in the manner described in Example 6.

The resulting stable fluid may, if so desired, be dehydrated by known technique, and used in dry form to fortify dry foods: in the alternative, the stable fluid may, after cooling, be incorporated as fortifying agent into foods at a liquiform stage of their processing.

I claim:

1. Process of encapsulating a water-insoluble compound of a metal of the group consisting of copper, iron and manganese; which comprises substantially colloidally dispersing the metal compound in an excess of a colloidal aqueous dispersion of a water-insoluble assimilable protective colloid, and effecting an adsorption reaction between the dispersed particles and said protective colloid, whereby the individual particles are enclosed within layers of said colloid and are suspended in said colloidal aqueous dispersion of water-insoluble assimilable protective colloid.

2. The process defined in claim 1, in which the metal compound is a metal phytate.

3. The process defined in claim 1, in which the metal compound is metal vitaminate.

4. The process defined in claim 1, in which the metal compound is a metal phosphate.

5. Process of preparing a fluid suspension of an assimilable compound of a metal of the group consisting of copper, iron and manganese, which metal compound is at best only poorly soluble in water, in an aqueous dispersion of a colloidal aqueous dispersion of water-insoluble assimilable protective colloid, which comprises dispersing the poorly soluble metal compound to a particular form approaching the colloidal state of subdivision while suspended in an aqueous dispersion of a water-insoluble assimilable protective colloid by violent agitation of said suspension, and effecting adsorption of a part of the protective colloid on the finely subdivided particles of metal compound, while so suspended, by heating the suspension in a pressure vessel to an elevated temperature of the order of 250° F. for a few minutes and simultaneously violently agitating said suspension.

GEORGE E. GRINDROD.

REFERENCES CITED

The following references are of record in the file of this patent:

UNITED STATES PATENTS

| Number | Name | Date |
|---|---|---|
| 1,662,930 | Laland | Mar. 20, 1928 |
| 2,028,575 | Torigian | Jan. 21, 1936 |
| 2,082,233 | Hoessle et al. | June 1, 1937 |
| 2,086,766 | Chuck | July 13, 1937 |
| 2,103,153 | Dunham | Dec. 21, 1937 |
| 2,150,472 | Vessie | Mar. 14, 1939 |
| 2,184,617 | Hurd | Dec. 26, 1939 |
| 2,239,543 | Andrews et al. | Apr. 22, 1941 |
| 2,260,870 | Ruskin | Oct. 28, 1941 |
| 2,300,410 | Ferrari | Nov. 3, 1942 |
| 2,310,383 | Andrews et al. | Feb. 9, 1943 |
| 2,359,413 | Freedman | Oct. 3, 1944 |
| 2,399,120 | Hurd | Apr. 23, 1946 |
| 2,410,110 | Taylor | Oct. 29, 1946 |
| 2,410,417 | Andersen | Nov. 5, 1946 |

FOREIGN PATENTS

| Number | Country | Date |
|---|---|---|
| 285,091 | Great Britain | June 10, 1929 |